(12) United States Patent
Ogasawara

(10) Patent No.: US 10,498,916 B2
(45) Date of Patent: Dec. 3, 2019

(54) IMAGE SCANNING DEVICE, MULTIFUNCTION PERIPHERAL, IMAGE SCANNING METHOD, AND NON-TRANSITORY COMPUTER-READABLE MEDIUM

(71) Applicant: Sharp Kabushiki Kaisha, Sakai, Osaka (JP)

(72) Inventor: Kenji Ogasawara, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/448,011

(22) Filed: Jun. 21, 2019

(65) Prior Publication Data

US 2019/0312988 A1    Oct. 10, 2019

Related U.S. Application Data

(63) Continuation of application No. 15/837,237, filed on Dec. 11, 2017, now Pat. No. 10,375,262.

(30) Foreign Application Priority Data

Dec. 12, 2016  (JP) .................................. 2016-240390

(51) Int. Cl.
*H04N 1/00*   (2006.01)
*H04N 1/393*  (2006.01)
(Continued)

(52) U.S. Cl.
CPC .......... *H04N 1/00779* (2013.01); *H04N 1/00* (2013.01); *H04N 1/00705* (2013.01); *H04N 1/00734* (2013.01); *H04N 1/00769* (2013.01); *H04N 1/028* (2013.01); *H04N 1/04* (2013.01); *H04N 1/047* (2013.01); *H04N 1/10* (2013.01);
(Continued)

(58) Field of Classification Search
CPC .. H04N 1/00779; H04N 1/3873; H04N 1/047; H04N 1/028; H04N 1/04; H04N 1/00; H04N 1/203; H04N 1/10; H04N 1/2038; H04N 1/393; H04N 1/00734;
(Continued)

(56) References Cited

FOREIGN PATENT DOCUMENTS

JP    2012-104986 A   5/2012

OTHER PUBLICATIONS

Ogasawara, "Image Scanning Device, Multifunction Peripheral, Image Scanning Method, and Non-Transitory Computer-Readable Medium", U.S. Appl. No. 15/837,237, filed Dec. 11, 2017.

*Primary Examiner* — Christopher Wait
(74) *Attorney, Agent, or Firm* — Keating & Bennett, LLP

(57) ABSTRACT

An image scanning device includes a placement-area image data capturing unit that captures placement-area image data corresponding to an area where documents are placed on a platen, a document image data capturing unit that captures pieces of document image data, each of which corresponds to one of the documents, and acquires positions of the pieces of document image data, in accordance with the placement-area image data captured by the placement-area image data capturing unit, a placement order acquiring unit that acquires an order in which the documents, each of which corresponds to one of the pieces of document image data, have been placed in accordance with at least the positions of the pieces of document image data, each of which corresponds to one of the documents, and a sequencing unit that assigns to the pieces of document image data the order acquired by the placement order acquiring unit.

7 Claims, 12 Drawing Sheets

(51) Int. Cl.
  *H04N 1/203*   (2006.01)
  *H04N 1/10*    (2006.01)
  *H04N 1/047*   (2006.01)
  *H04N 1/04*    (2006.01)
  *H04N 1/028*   (2006.01)
  *H04N 1/387*   (2006.01)

(52) U.S. Cl.
  CPC ........... *H04N 1/203* (2013.01); *H04N 1/2038* (2013.01); *H04N 1/3873* (2013.01); *H04N 1/393* (2013.01); *H04N 2201/0094* (2013.01)

(58) Field of Classification Search
  CPC ........... H04N 1/00705; H04N 1/00769; H04N 2201/0094; G03B 27/62
  See application file for complete search history.

FIG. 6

|  |  | DOCUMENT PLACEMENT DETECTING SENSOR | | | | | | | |
| --- | --- | --- | --- | --- | --- | --- | --- | --- | --- |
|  |  | S1 | S2 | S3 | S4 | S5 | S6 | S7 | S8 |
| DOCUMENT SIZE | A5 | ○ | × | × | × | × | × | × | × |
|  | B5 | ○ | ○ | × | × | × | × | × | × |
|  | A4 | ○ | ○ | ○ | ○ | × | × | × | × |
|  | B5R | × | × | × | ○ | ○ | × | × | × |
|  | A4R | ○ | × | × | ○ | ○ | ○ | × | × |
|  | B4 | ○ | ○ | × | ○ | ○ | ○ | ○ | × |
|  | A3 | ○ | ○ | ○ | ○ | ○ | ○ | ○ | ○ |

IMAGE SCANNING DEVICE, MULTIFUNCTION PERIPHERAL, IMAGE SCANNING METHOD, AND NON-TRANSITORY COMPUTER-READABLE MEDIUM

BACKGROUND

1. Field

The present disclosure relates to an image scanning device, a multifunction peripheral including the image scanning device, an image scanning method, and a non-transitory computer-readable medium storing an image scanning program.

2. Description of the Related Art

A multifunction peripheral is an image copier that includes an image forming device and an image scanning device and that additionally has various functions such as a network connection function, a facsimile function, a data communication function, a data input/output function, and a data storage function. In some multifunction peripherals, the image scanning device incorporates a multiple cropping function. Some stand-alone image scanning devices also incorporate the multiple cropping function. The multiple cropping function refers to a function that captures placement-area image data, which is image data corresponding to an area where a plurality of documents such as photographs are placed on a platen, and that separately extracts a piece of document image data corresponding to each of the plurality of documents from the placement-area image data.

Pieces of document image data that are extracted by a common multiple cropping function are arranged in a fixed order that follows, for example, a predetermined scanning order of a placement-area image data. Alternatively, pieces of document image data are arranged, for example, in an order that follows a scanning order that a user selects or determines for the placement-area image data (see, for example, Japanese Unexamined Patent Application Publication No. 2008-34973). Then, the pieces of document image data are output, numbered, or assigned respective filenames in accordance with the order thus determined.

Thus, a user needs knowledge of the scanning order in advance and decides the order in which documents are placed on the platen to assign an intended order to the pieces of document image data. This is cumbersome for the user, and the user may not necessarily assign the intended order to the pieces of document image data because of an error or a mistake committed by the user. When the assigned order does not match the intended one, the user has to manually correct the filenames of the pieces of document image data, for example. In addition, in the case that a plurality of pieces of document image data are printed on a sheet of paper in accordance with the assigned order, if the assigned order does not match the intended one, the user has to repeat the job from scratch.

SUMMARY

Thus, it is desirable that a user can assign, easily and without error, an intended order to pieces of document image data obtained by a multiple cropping process. Assigning an order in which documents have been placed on a platen to the pieces of document image data as it is suits this purpose.

The present disclosure provides an image scanning device that incorporates a multiple cropping function that enables a user to assign an order in which documents have been placed on a platen to pieces of document image data as it is, a multifunction peripheral that includes the image scanning device, an image scanning method that implements such a multiple cropping function, and a non-transitory computer-readable medium storing an image scanning program that implements the same.

According to an aspect of the present disclosure, there is provided an image scanning device that includes a placement-area image data capturing unit that captures placement-area image data corresponding to an area where a plurality of documents are placed on a platen; a document image data capturing unit that captures a plurality of pieces of document image data, each of which corresponds to one of the plurality of documents placed on the platen, and acquires positions of the plurality of pieces of document image data, in accordance with the placement-area image data captured by the placement-area image data capturing unit; a placement order acquiring unit that acquires an order in which the plurality of documents, each of which corresponds to one of the plurality of pieces of document image data, have been placed on the platen in accordance with at least the positions of the plurality of pieces of document image data, each of which corresponds to one of the plurality of documents placed on the platen; and a sequencing unit that assigns the order acquired by the placement order acquiring unit to the plurality of pieces of document image data.

According to another aspect of the present disclosure, there is provided a multifunction peripheral that includes the aforementioned image scanning device.

According to another aspect of the present disclosure, there is provided an image scanning method that includes capturing placement-area image data corresponding to an area where a plurality of documents are placed on a platen; capturing a plurality of pieces of document image data, each of which corresponds to one of the plurality of documents placed on the platen, and acquiring positions of the plurality of pieces of document image data, in accordance with the placement-area image data captured in the capturing of the placement-area image data; acquiring an order in which the plurality of documents, each of which corresponds to one of the plurality of pieces of document image data, have been placed on the platen in accordance with at least the positions of the plurality of pieces of document image data, each of which corresponds to one of the plurality of documents placed on the platen; and assigning the order acquired in the acquiring of the order to the plurality of pieces of document image data.

According to another aspect of the present disclosure, there is provided a non-transitory computer-readable medium storing an image scanning program causing a computer to function as the aforementioned image scanning device.

BRIEF DESCRIPTION OF THE DRAWINGS

FIG. 6 is a table illustrating correspondence between document size and a combination of document presence states detected by a plurality of document placement detecting sensors disposed under the platen of the image scanning device incorporated into the multifunction peripheral according to the first embodiment of the present disclosure;

DESCRIPTION OF THE EMBODIMENTS

Hereinafter, embodiments of the present disclosure will be described in detail with reference to the drawings.

First Embodiment

Figure 1:
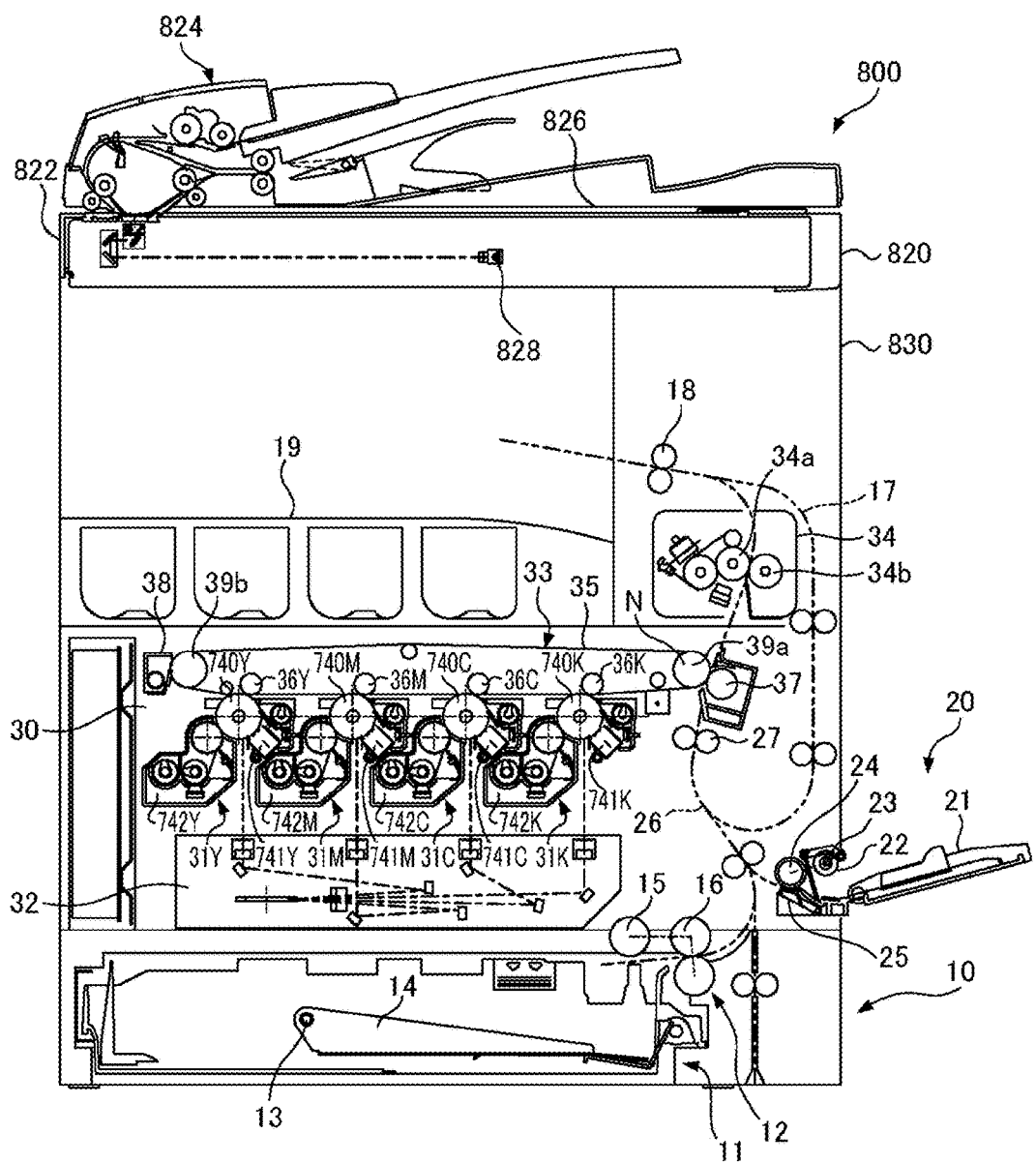
FIG. 1 is a conceptual cross sectional view of a multifunction peripheral according to an embodiment of the present disclosure.
Figure 2:
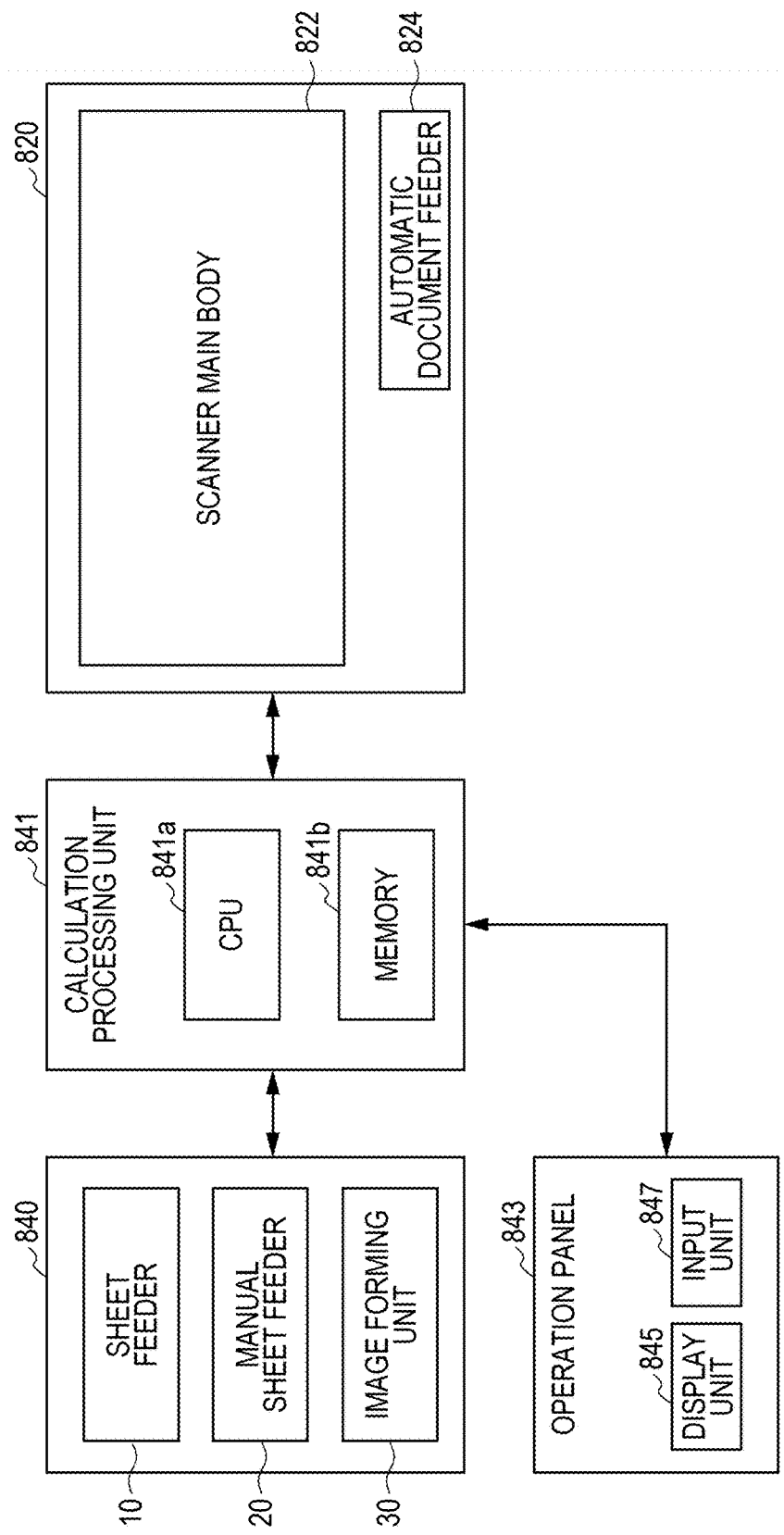
FIG. 2 is a functional block diagram of the multifunction peripheral according to the embodiment of the present disclosure.
Figure 3:
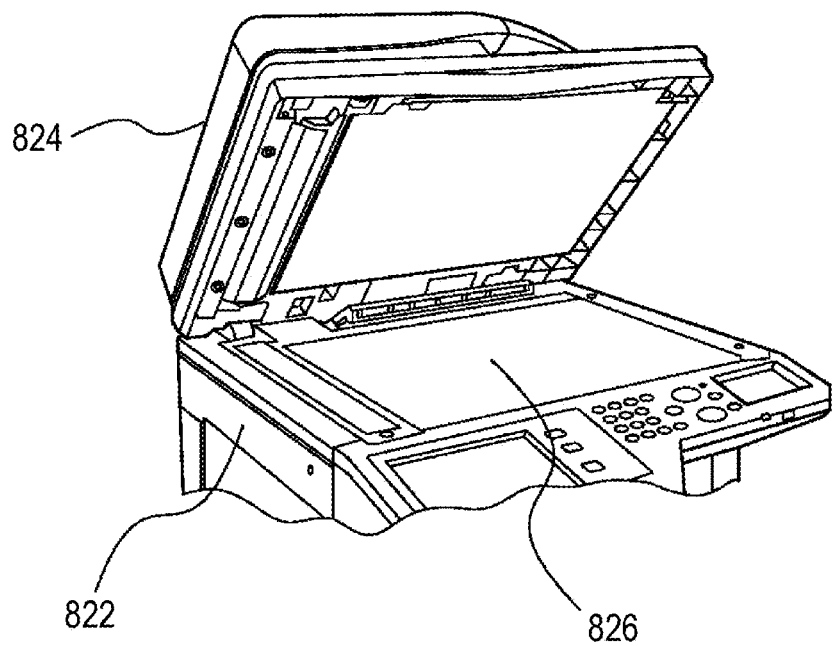
FIG. 3 is a partial perspective view of the exterior of the multifunction peripheral according to the embodiment of the present disclosure.

Referring to FIGS. 1, 2, and 3, an image scanning device 820 includes an automatic document feeder (single pass feeder or SPF) 824 that automatically feeds a document, and a scanner main body 822 that scans a document image. The image scanning device 820 includes, in addition to the components depicted in FIG. 2, components that are not depicted in FIG. 2 but depicted in FIG. 1. The scanner main body 822 also includes a platen 826 as depicted in FIGS. 1 and 3. The platen 826 has a transparent glass plate, for example, and an image of a document placed on the platen 826 is scanned by using an image sensor disposed under the platen 826.

Figure 4:
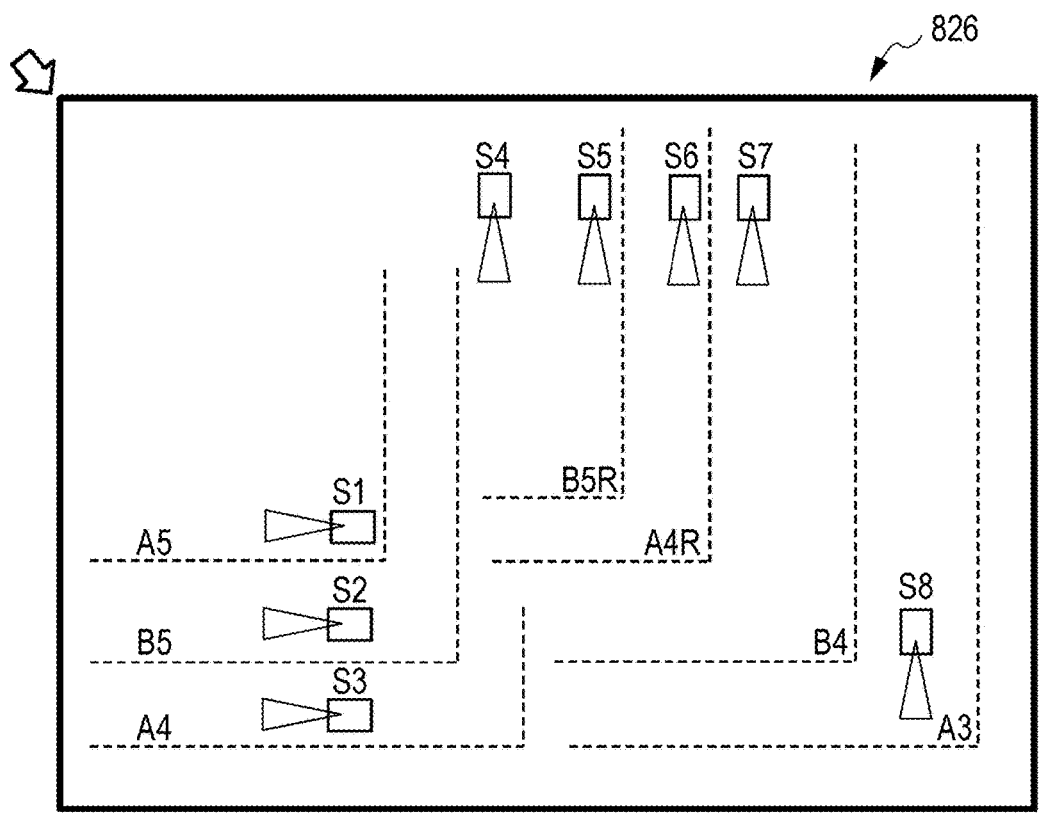
FIG. 4 is a plan view of a plurality of document placement detecting sensors disposed under a platen of an image scanning device incorporated into a multifunction peripheral according to an embodiment of the present disclosure.
Figure 5A:
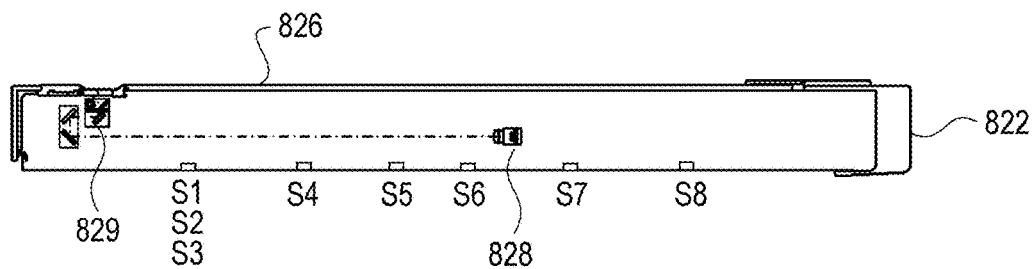
FIG. 5A is a cross-sectional side view of an image scanning device incorporated into a multifunction peripheral according to a first embodiment of the present disclosure.

Referring further to FIGS. 4 and 5A, a plurality of document placement detecting sensors (reflection type) (hereinafter, sometimes referred to simply as sensors) S1 to S8 are disposed under the platen 826 in addition to a document scanning sensor 828 and a mirror base 829. When viewed from above the platen 826, the plurality of document placement detecting sensors (reflection type) S1 to S8 are disposed as depicted in FIG. 4.

Referring to FIGS. 4 and 6, assuming that a document is placed so that a corner of the document is positioned at the upper-left corner of the platen 826, if the document size is A5, the sensor S1 detects the presence of the document above, but the other sensors S2 to S8 do not detect the presence of the document above. If the document size is B5, the sensors S1 and S2 detect the presence of the document above, but the other sensors S3 to S8 do not detect the presence of the document above. If the document size is A4, the sensors S1 to S4 detect the presence of the document above, but the other sensors S5 to S8 do not detect the presence of the document above. Other document sizes are also depicted in FIGS. 4 and 6, and further descriptions will not be given herein.

Figure 7:
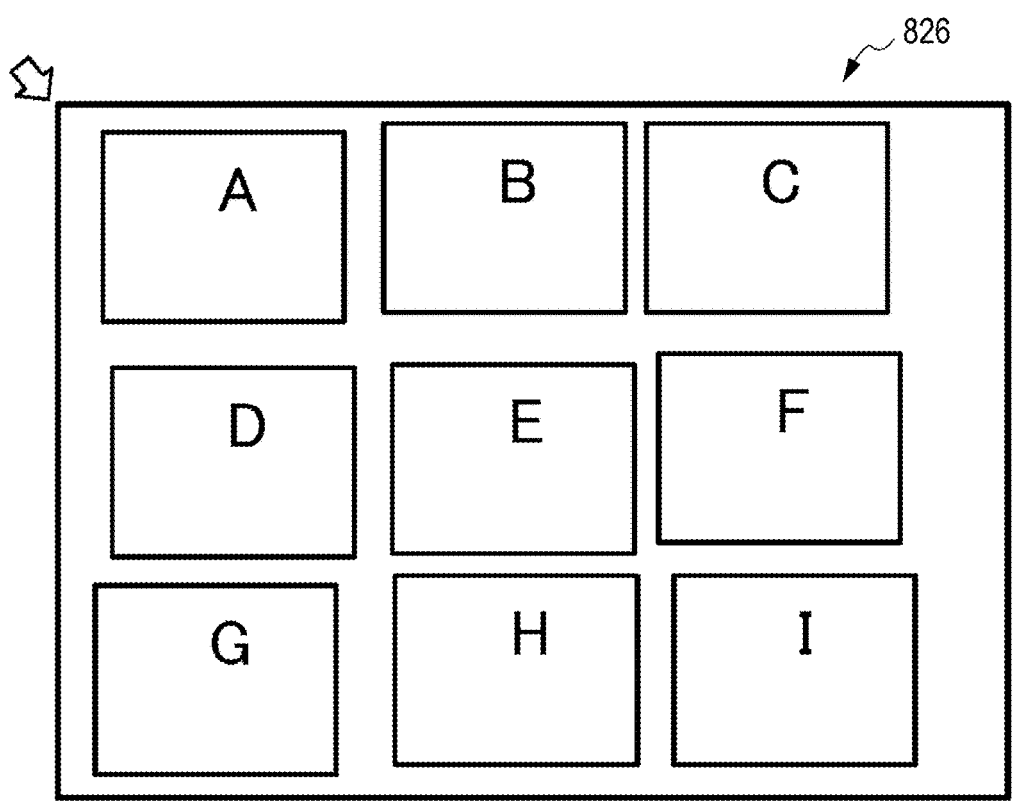
FIG. 7 is a plan view illustrating an example in which documents are placed in three rows and three columns on the platen of the image scanning device incorporated into the multifunction peripheral according to the first embodiment of the present disclosure.
Figure 8:
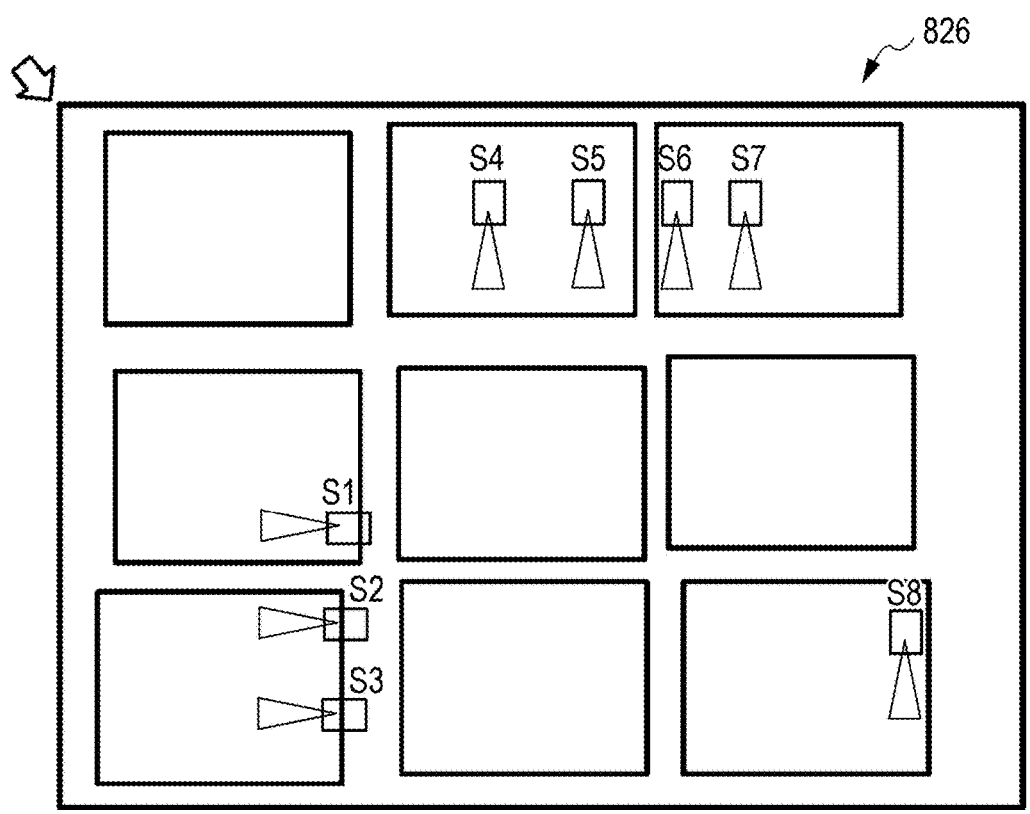
FIG. 8 is a plan view illustrating relation between the positions of the plurality of document placement detecting sensors and the positions of the documents placed in three rows and three columns on the platen of the image scanning device incorporated into the multifunction peripheral according to the first embodiment of the present disclosure.

For the case that documents A to I such as photographs and the like are placed in three rows and three columns on the platen 826 as depicted in FIG. 7, relation between the positions of the plurality of sensors S1 to S8 and the positions of the documents A to I is depicted in FIG. 8. If the rows are counted from above and the columns are counted from left, when the document B is placed in the first row and the second column, the sensors S4 and S5 detect the document. When the document C is placed in the first row and the third column, the sensors S6 and S7 detect the document. When the document D is placed in the second row and the first column, the sensor S1 detects the document. When the document G is placed in the third row and the first column, the sensors S2 and S3 detect the document. When the document I is placed in the third row and the third column, the sensor S8 detects the document. When the document A is placed in the first row and the first column, when the document E is placed in the second row and the second column, when the document F is placed in the second row and the third column, and when the document H is placed in the third row and the second column, no sensors detect the documents.

Thus, a direction in which documents have been placed can be deduced based on a temporal change in a combination of document presence states detected by the plurality of sensors S1 to S8.

For example, if the combination of the sensors that detect the presence of the document changes as follows,
S4, S5
→S4, S5, S6, S7
→S4, S5, S6, S7, S1
→S4, S5, S6, S7, S1, S2, S3
→S4, S5, S6, S7, S1, S2, S3, S8,
it can be deduced that the documents have been placed in the order of the document A, the document B, the document C, the document D, the document E, the document F, the document G, the document H, and the document I. In other words, it can be deduced that the documents have been placed from left to right and from top to bottom so that a row is filled before a column.

Alternatively, for example, if the combination of the sensors that detect the presence of the document changes as follows,
S1
→S1, S2, S3
→S1, S2, S3, S4, S5
→S1, S2, S3, S4, S5, S6, S7
→S1, S2, S3, S4, S5, S6, S7, S8, it can be deduced that the documents have been placed in the order of the document A, the document D, the document G, the document B, the document E, the document H, the document C, the document F, and the document I. In other words, it can be deduced that the documents have been placed from left to right and from top to bottom so that a column is filled before a row.

Further, for example, if the combination of the sensors that detect the presence of the document changes as follows,
S8
→S8, S2, S3
→S8, S2, S3, S1
→S8, S2, S3, S1, S6, S7
→S8, S2, S3, S1, S6, S7, S4, S5,
it can be deduced that the documents have been placed in the order of the document I, the document H, the document G, the document F, the document E, the document D, the document C, the document B, and the document A. In other words, it can be deduced that the documents have been placed from right to left and from bottom to top so that a row is filled before a column.

Further, for example, if the combination of the sensors that detect the presence of the document changes as follows,
S8
→S8, S6, S7
→S8, S6, S7, S4, S5
→S8, S6, S7, S4, S5, S2, S3
→S8, S6, S7, S4, S5, S2, S3, S1,
it can be deduced that the documents have been placed in the order of the document I, the document F, the document C, the document H, the document E, the document B, the document G, the document D, and the document A. In other words, it can be deduced that the documents have been placed from right to left and from bottom to top so that a column is filled before a row.

In addition, there are cases in which it can be deduced that the documents have been placed from left to right and from bottom to top so that a row is filled before a column, from left to right and from bottom to top so that a column is filled before a row, from right to left and from top to bottom so that a row is filled before a column, and from right to left and from top to bottom so that a column is filled before a row. Such cases are not described in detail.

Although the number of documents placed on the platen 826 often falls short of full coverage of the whole area of the platen 826, a direction in which documents have been placed is sometimes deduced based on part of a temporal change in a combination of document presence states detected by the sensors. For example, if the combination of the sensors that detect the presence of the document changes as follows,
S4, S5
→S4, S5, S6, S7,
it can be deduced that at least the document A, the document B, and the document C have been placed in this order. In addition, it can be deduced that documents have been placed from left to right in the top row.

Further, for example, if the combination of the sensors that detect the presence of the document changes as follows,
S4, S5
→S4, S5, S6, S7
→S4, S5, S6, S7, S1,
it can be deduced that at least the document A, the document B, the document C, the document D, the document E, and the document F have been placed in this order. In other words, it can be deduced that the documents have been placed from left to right and from top to bottom so that a row is filled before a column.

Figure 9:
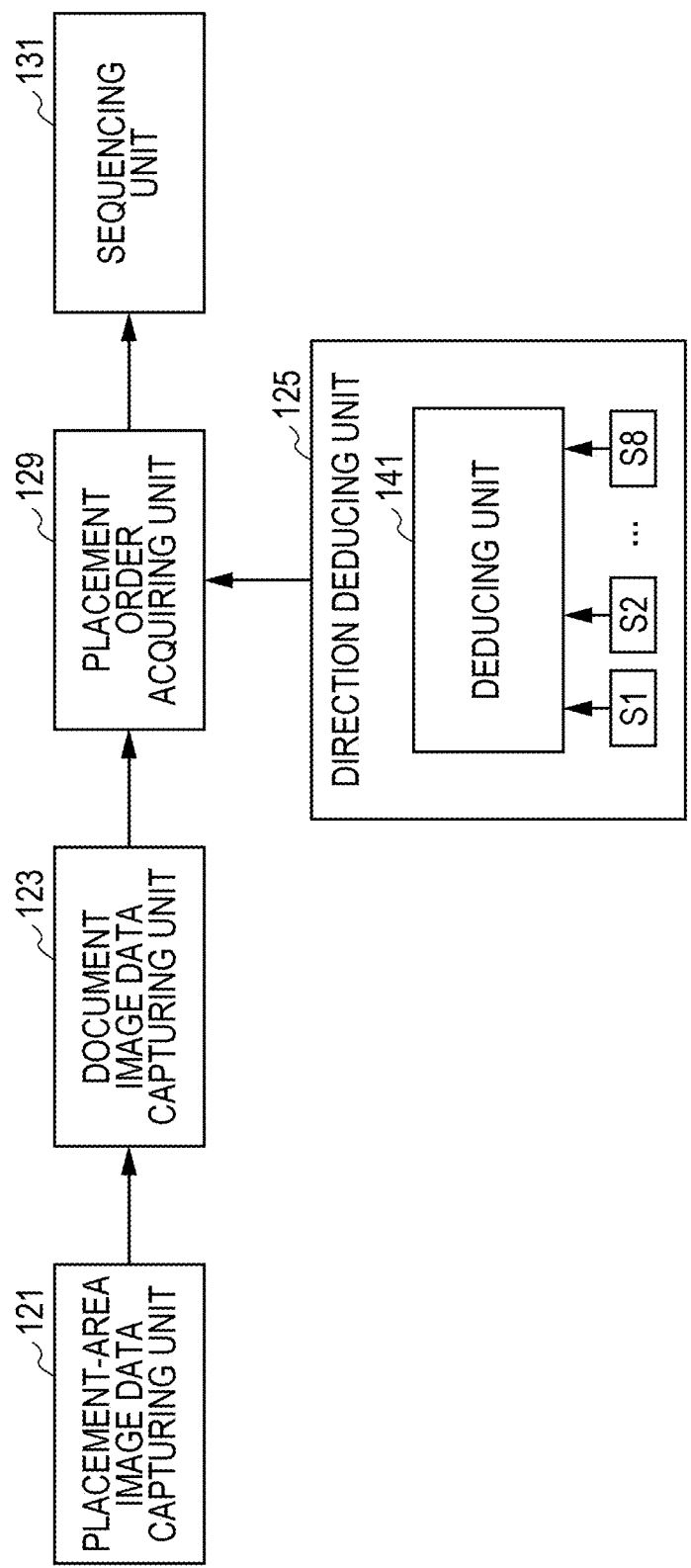
FIG. 9 is a functional block diagram of the image scanning device according to the first embodiment of the present disclosure.

As depicted in FIG. 9, the image scanning device 820 according to the present embodiment includes a placement-area image data capturing unit 121, a document image data capturing unit 123, a direction deducing unit 125, a placement order acquiring unit 129, and a sequencing unit 131. The direction deducing unit 125 includes the sensors S1 to S8 and a deducing unit 141.

The placement-area image data capturing unit 121 captures placement-area image data corresponding to an area where a plurality of documents are placed on the platen 826.

The document image data capturing unit 123 captures a plurality of pieces of document image data, each of which corresponds to one of the plurality of documents placed on the platen 826, and acquires positions of the plurality of pieces of document image data in accordance with the placement-area image data captured by the placement-area image data capturing unit 121.

The direction deducing unit 125 deduces a direction in which the plurality of documents have been placed on the platen 826. The sensors S1 to S8 included in the direction deducing unit 125, each of which detects whether a document is placed in a predetermined separate place on the platen 826, function as a plurality of placement detectors. The deducing unit 141, which is included in the direction deducing unit 125, deduces the direction in which the plurality of documents have been placed on the platen 826 based on the temporal change in the combination of document presence states detected by the plurality of sensors S1 to S8.

In accordance with the direction deduced by the direction deducing unit 125 and the positions of the plurality of pieces of document image data acquired by the document image data capturing unit 123, the placement order acquiring unit 129 acquires the order in which the plurality of documents, each of which corresponds to one of the plurality of pieces of document image data, have been placed on the platen 826.

The sequencing unit 131 assigns the order acquired by the placement order acquiring unit 129 to the plurality of pieces of document image data.

Figure 10:
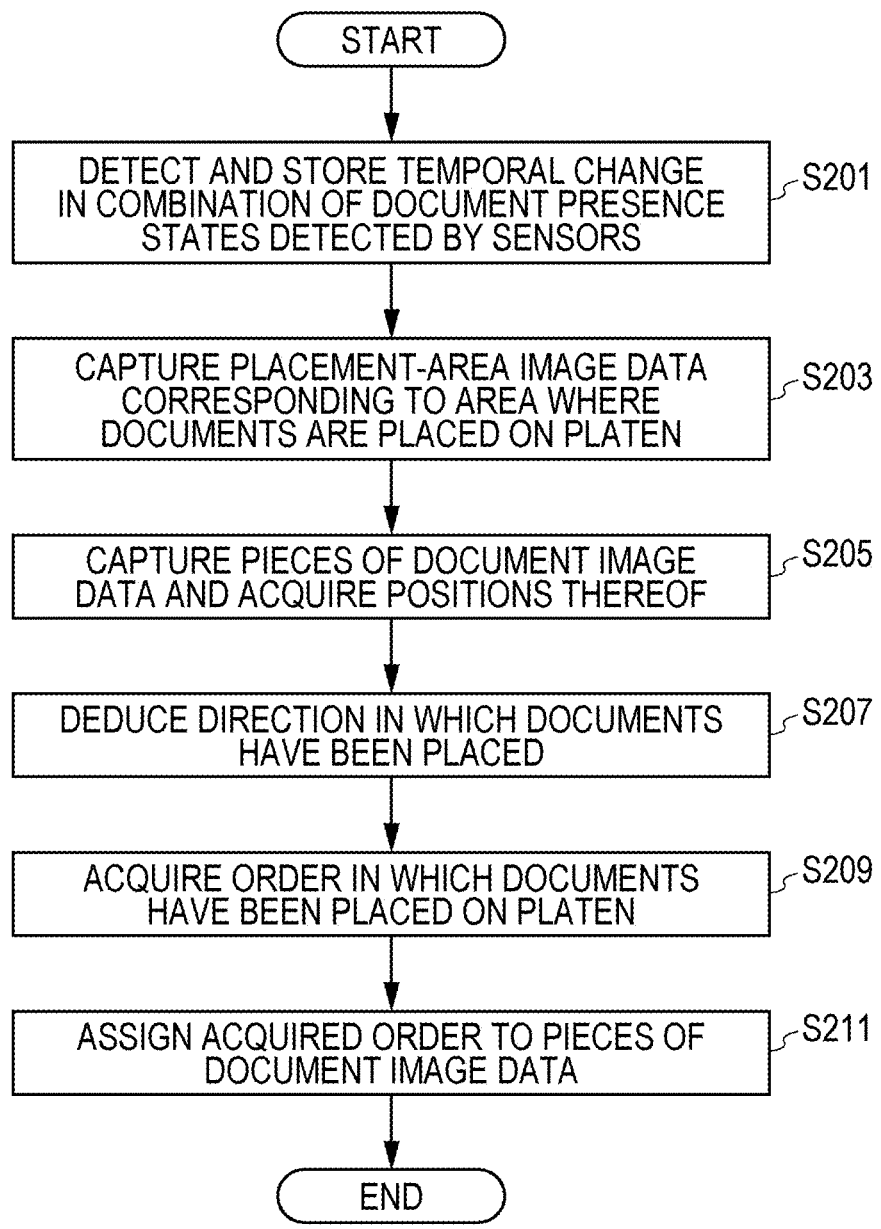
FIG. 10 is a flowchart of an image scanning method performed by the image scanning device according to the first embodiment of the present disclosure.

Next, referring to FIG. 10, image scanning according to the present embodiment will be described.

First, a temporal change in a combination of document presence states detected by the plurality of sensors S1 to S8 is detected and stored while a user or the like places documents on the platen 826 in succession (step S201).

Then, when all the documents have been placed, placement-area image data corresponding to an area where the plurality of documents are placed on the platen 826 is captured following an operation by the user or the like (step S203).

Next, in accordance with the placement-area image data corresponding to the area where the plurality of documents are placed on the platen 826, which is obtained in step S203, a plurality of pieces of document image data (for example, document image data A to document image data I), each of which corresponds to one of the plurality of documents (for example, the document A to the document I) placed on the platen 826, are captured, and the positions of the plurality of pieces of document image data (for example, the center coordinates of document images represented by the plurality of pieces of document image data with respect to a predetermined position on the platen 826) are acquired (step S205).

Then a direction in which the plurality of documents have been placed on the platen 826 is deduced based on the temporal change in the combination of document presence states detected by the plurality of sensors S1 to S8 (step S207). The temporal change in the combination is stored in step S201. A direction in which the plurality of documents have been placed can be defined by three factors, which are whether priority is given to the column direction or the row direction, the order in the top-bottom direction, and the order in the left-right direction. These three factors are deduced. The method of deduction is described above.

Next, in accordance with the deduced direction and the position of each of the plurality of pieces of document image data, the order in which the plurality of documents (for example, the document A to the document I) have been placed on the platen 826 is acquired (step S209). Each of the plurality of documents corresponds to one of the plurality of pieces of document image data (for example, the document image data A to the document image data I). Specifically, the positions of the plurality of pieces of document image data (for example, the document image data A to the document image data I) acquired in step S205 are tracked in the direction deduced in step S207, and the order is assigned to the positions.

Then, the order acquired in step S209 is assigned to the plurality of pieces of document image data (for example, the document image data A to the document image data I) (step S211).

Second Embodiment

In the first embodiment, a plurality of document placement detecting sensors are used to deduce the direction in which a plurality of documents have been placed on the platen 826. Then, the order in which the plurality of documents, each of which corresponds to one of the plurality of pieces of document image data, have been placed on the platen 826 is acquired in accordance with the deduced direction and the position of each of the plurality of pieces of document image data.

Figure 5B:
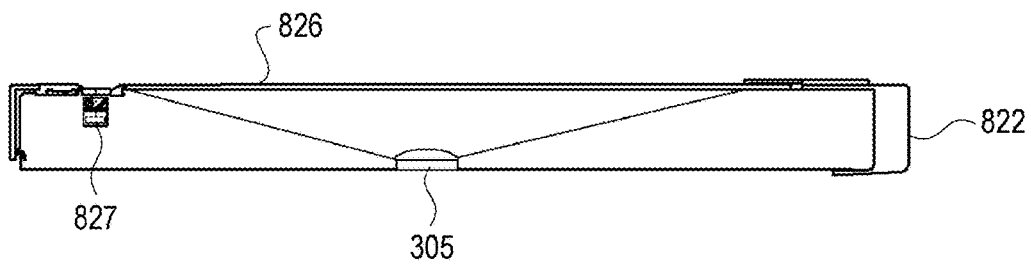
FIG. 5B is a cross-sectional side view of an image scanning device incorporated into a multifunction peripheral according to a second embodiment of the present disclosure.

On the other hand, in a second embodiment, as depicted in FIG. 5B, a lower wide-angle camera 305 is used in place of the document placement detecting sensors. The lower wide-angle camera 305 acquires moving images of an area where a plurality of documents are placed on the platen 826, captured from below the platen 826. The moving images thus acquired are analyzed to detect the positions of the plurality of documents successively placed on the platen 826 and the order in which the plurality of documents have been placed. Then, in accordance with the positions and the order thus detected and the positions of the plurality of pieces of document image data extracted from the placement-area image data, the order in which the plurality of documents, each of which corresponds to one of the plurality of pieces of document image data extracted from the placement-area image data, have been placed on the platen 826 is acquired. In addition to the documents, the camera may capture images of hands or arms of the user who places the documents on the platen 826, and these images may be mistakenly identified as a document. A process is performed to detect the correct order of the pieces of extracted document image data even if such false identification occurs. In addition, a process is appropriately performed in the case that a document is removed after it has been placed on the platen 826.

As depicted in FIG. 5B, a movable document scanning sensor 827 is disposed under the platen 826 in place of the fixed document scanning sensor 828 and the mirror base 829. In addition, the lower wide-angle camera 305 is disposed under the platen 826. In this way, the lower wide-angle camera 305 does not capture images of the image scanning components such as the fixed document scanning sensor 828 and the mirror base 829.

Figure 11:
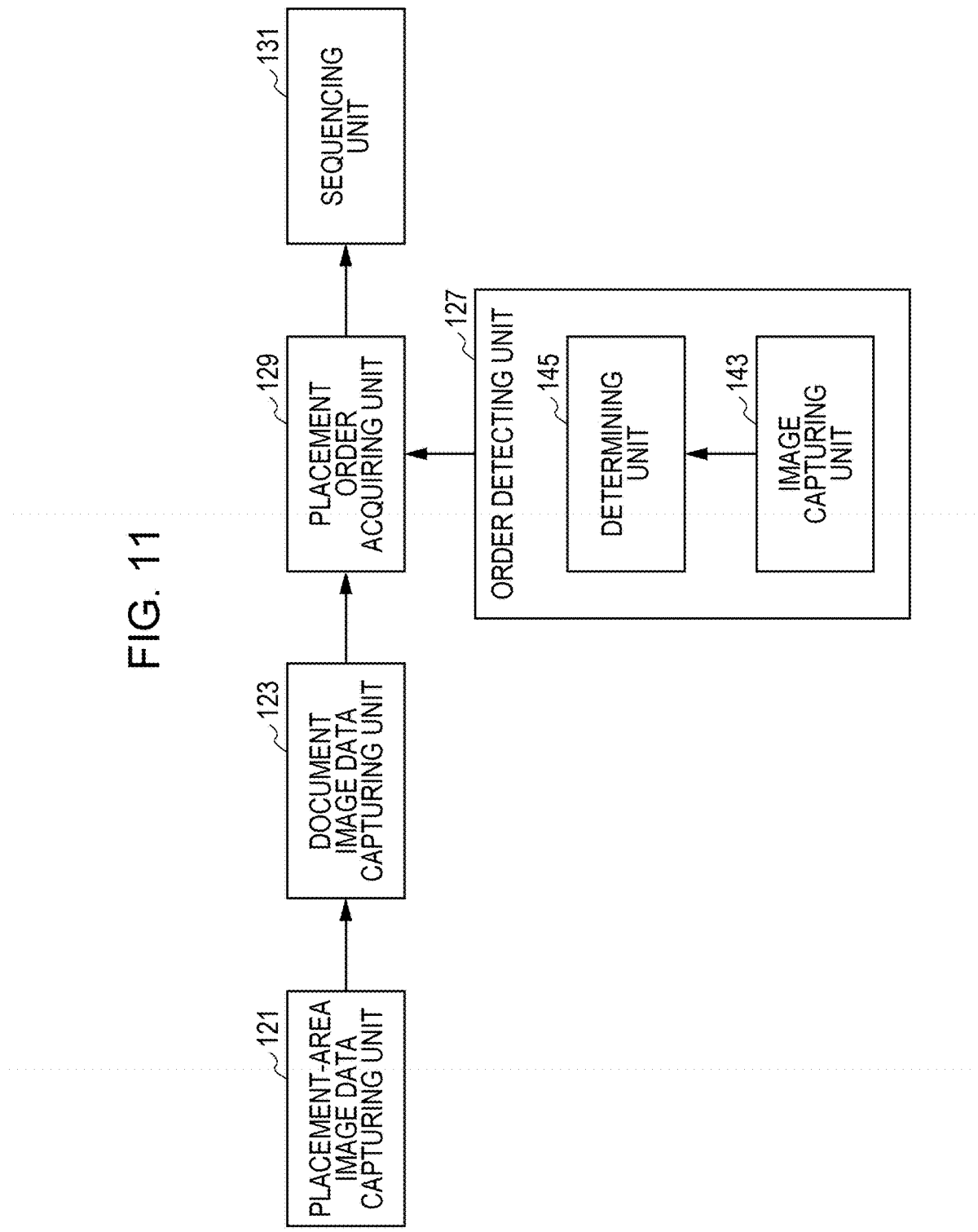
FIG. 11 is a functional block diagram of the image scanning device according to the second embodiment of the present disclosure.

As depicted in FIG. 11, an image scanning device 820 according to the present embodiment includes a placement-area image data capturing unit 121, a document image data capturing unit 123, an order detecting unit 127, a placement order acquiring unit 129, and a sequencing unit 131. The order detecting unit 127 includes an image capturing unit 143 and a determining unit 145.

The placement-area image data capturing unit 121 captures placement-area image data corresponding to an area where a plurality of documents are placed on the platen 826.

In accordance with the placement-area image data captured by the placement-area image data capturing unit 121, the document image data capturing unit 123 captures a plurality of pieces of document image data, each of which corresponds to one of the plurality of documents placed on the platen 826. The document image data capturing unit 123 also acquires positions of the plurality of pieces of document image data.

The order detecting unit 127 detects positions and an order in which a plurality of document candidates have been placed on the platen 826. The image capturing unit 143, which is included in the order detecting unit 127, acquires moving images by capturing images of the platen 826 and corresponds to the lower wide-angle camera 305. The determining unit 145, which is included in the order detecting unit 127, determines the order in which the document candidates have been placed in accordance with the moving images captured by the image capturing unit 143. The order detecting unit 127 detects a plurality of document candidates placed on the platen 826 and the order in which the plurality of document candidates have been placed on the platen 826 in response to placement of a new document candidate on the platen 826 and removal of a document candidate present on the platen 826 from the platen 826.

In accordance with the positions and the order in which the plurality of document candidates have been placed, both of which have been detected by the order detecting unit 127, and the positions of the plurality of pieces of document image data acquired by the document image data capturing unit 123, the placement order acquiring unit 129 acquires the order in which the plurality of documents, each of which corresponds to one of the plurality of pieces of document image data, have been placed on the platen 826. The placement order acquiring unit 129 also compares the positions of the plurality of document candidates detected by the order detecting unit 127 and the positions of the plurality of pieces of document image data acquired by the document image data capturing unit 123. Then the placement order acquiring unit 129 updates the order detected by the order detecting unit 127 by removing a document candidate whose position corresponds to none of the positions of the plurality of pieces of document image data. The placement order acquiring unit 129 thus acquires the order in which the plurality of documents have been placed on the platen 826 in accordance with the correspondence between the positions and the order of the plurality of document candidates updated as above and the correspondence between the position of each of the document candidates that has a corresponding piece of the document image data and the position of the corresponding piece of the document image data.

The sequencing unit 131 assigns the order acquired by the placement order acquiring unit 129 to the plurality of pieces of document image data.

Figure 12:
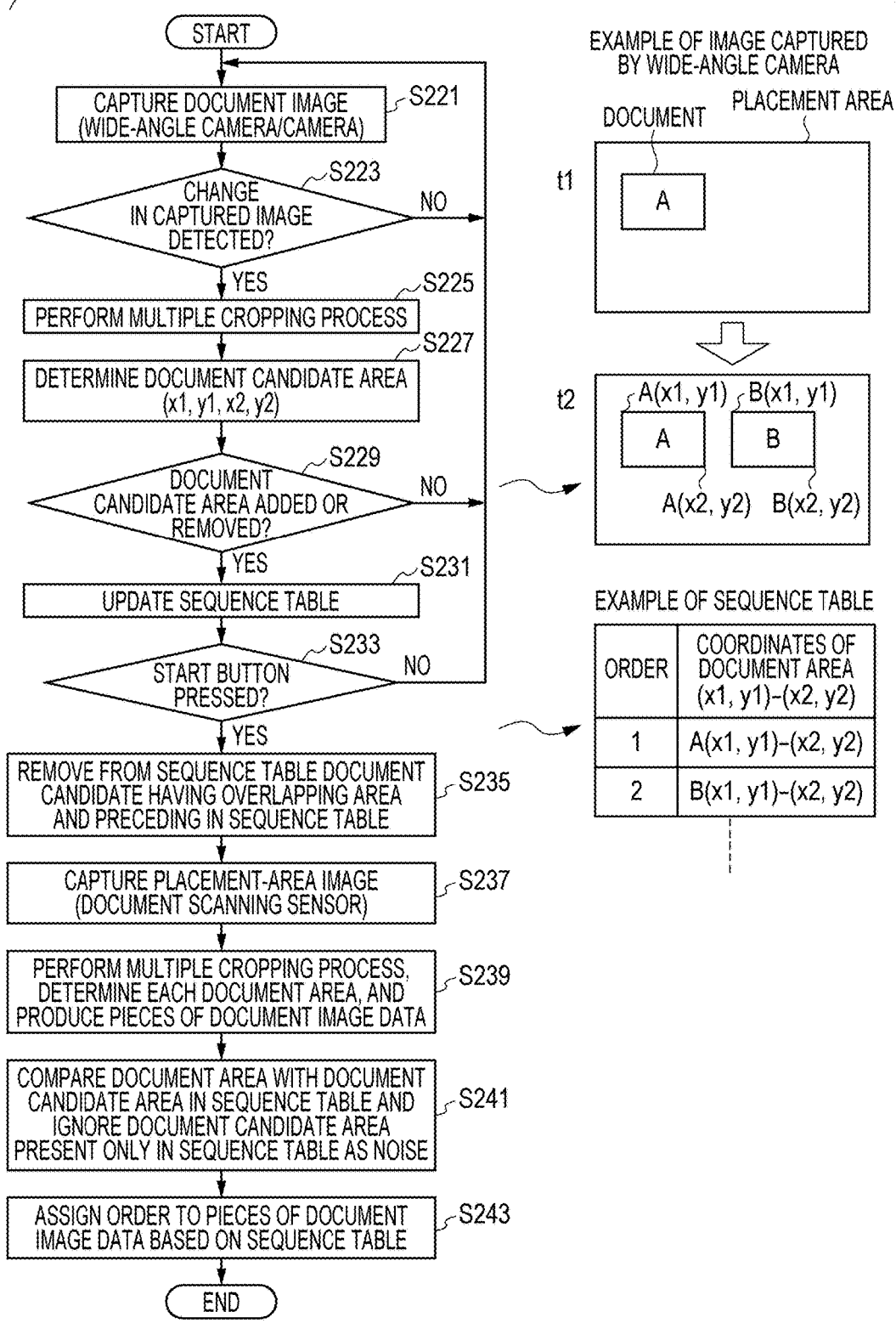
FIG. 12 is a flowchart of an image scanning method performed by the image scanning device according to the second embodiment of the present disclosure.

Next, referring to FIG. 12, image scanning according to the present embodiment will be described.

First, still image data of an area where a plurality of documents are placed on the platen 826 is repeatedly acquired at predetermined regular intervals by capturing images of the platen 826 by using the lower wide-angle camera 305 (step S221 and NO in step S223).

If a change in the still image data is detected among the most recent n pieces of still image data and the still image data is found to remain unchanged after the detected change for a predetermined period of time or longer (YES in step S223), a multiple cropping process is performed on the still image data that remains unchanged after the change, and one or more document candidates are acquired (step S225).

Next, an area for each of the document candidates acquired by the multiple cropping process in the most recent step S225 is determined (step S227). For example, the area is defined by the smallest possible rectangle within which the area is included and specified by coordinates (x1, y1) of the upper-left corner of the rectangle and coordinates (x2, y2) of the lower-right corner of the rectangle (two sets of coordinates are combined and denoted by (x1, y1, x2, y2)). In the case of two document candidates, for example, A(x1, y1, x2, y2) and B(x1, y1, x2, y2) are determined.

Next, whether addition or removal of a document candidate has occurred is determined by comparing document candidates acquired in the most recent step S225 and document candidates acquired in the preceding step S225 (step S229). If no addition or removal of a document candidate is detected (NO in step S229), the process returns to step S221. If addition or removal of a document candidate is detected (YES in step S229), a sequence table is updated (step S231). The sequence table, an example of which is depicted in FIG. 12, contains an entry for each document candidate. The entry includes the order in which a document candidate is added to the sequence table and the coordinates of an area of the document candidate. When a new document candidate is added, an entry for the new document candidate is added to the sequence table along with a newly assigned sequence number, which is subsequent to the maximum sequence number in the sequence table before the new document candidate is added. When a document candidate is removed, the entry for the removed document candidate is removed from the sequence table, and the sequence numbers of document candidates following the removed document candidate are decreased by one.

If pressing a start button is not detected next (NO in step S233), the process returns to step S221. If pressing the start button is detected (YES in step S233), the process proceeds to step S235.

In step S235, a document candidate is removed from the sequence table if the document candidate occupies an area that overlaps an area occupied by another document candidate that is subsequent to the document candidate in the sequence table (step S235). Hereinafter, the document candidate to be removed is referred to as the preceding overlap document candidate. The preceding overlap document candidate is to be removed because it is a document candidate that occupies the area overlapping an area occupied by a document candidate that is present on the platen 826 when the start button is pressed (hereinafter referred to as the present document candidate). The preceding overlap document candidate has been added to the sequence table before the present document candidate. Thus, it is possible that the document corresponding to the preceding overlap document candidate has been removed. Otherwise, a hand or an arm of the user who places a document corresponding to a document candidate that is present in the vicinity of the present document candidate and that has a sequence number preceding that of the present document candidate has been detected. Even if the foregoing assumption is not the case, the preceding overlap document candidate is to be removed because priority is given to the present document candidate, which is present on the platen 826 when the start button is pressed, in establishing correspondence between the document candidates and document image data.

Next, the placement-area image data corresponding to an area where the plurality of documents are placed on the platen 826 is captured by using the document scanning sensor 827 (step S237).

Then, a multiple cropping process is performed on the placement-area image data, and consequently a plurality of pieces of document image data, each of which corresponds to one of the plurality of documents placed on the platen 826, and the positions of the plurality of pieces of document image data are acquired (step S239).

Then, the positions of the plurality of document candidates detected in step S227 and the positions of the plurality of pieces of document image data acquired in step S239 are compared with each other, and a document candidate whose position corresponds to none of the positions of the plurality of pieces of document image data is removed from the sequence table, by which the order detected in step S227 is updated. The order in which the plurality of documents have been placed on the platen 826 is acquired in accordance with the correspondence between the positions and the order of the plurality of document candidates in the updated sequence table and the correspondence between the position of each of the document candidates that has a corresponding piece of the document image data and the position of the corresponding piece of the document image data (step S241).

Then, the order acquired in step S241 is assigned to the plurality of pieces of document image data (step S243).

In the first embodiment, in the case that the plurality of documents are not aligned in a row or column, the order in which the plurality of documents have been placed on the platen 826 may not be acquired correctly. In the second embodiment, even if the plurality of documents are placed with no regular pattern on the platen 826, the order in which the plurality of documents are placed on the platen 826 can be acquired correctly.

Third Embodiment

Figure 5C:
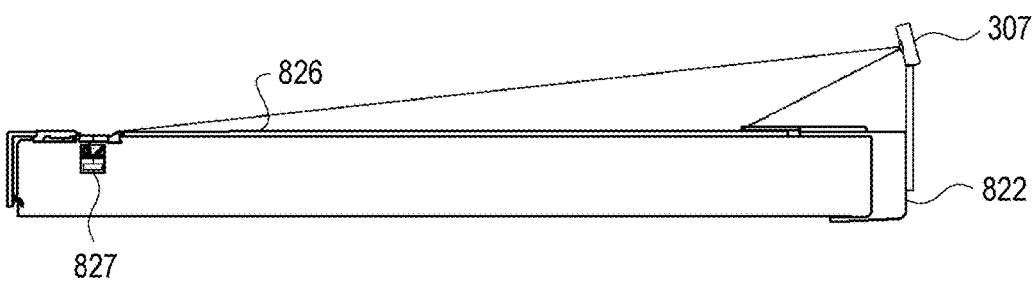
FIG. 5C is a cross-sectional side view of an image scanning device incorporated into a multifunction peripheral according to a third embodiment of the present disclosure.

In the second embodiment, as depicted in FIG. 5B, the lower wide-angle camera 305, which is used as the image capturing unit 143, acquires the moving images captured from under the area where the plurality of documents are placed on the platen 826. In a third embodiment, as depicted in FIG. 5C, an upper camera 307, which is used as the image capturing unit 143, acquires moving images captured from above the area where the plurality of documents are placed on the platen 826.

Other elements and features are the same as or similar to those in the second embodiment and are not repeatedly described herein.

Fourth Embodiment

A fourth embodiment relates to a multifunction peripheral 800 that includes the image scanning device according to the first to third embodiments. FIGS. 1 and 2 depict a configuration and the like of the multifunction peripheral 800.

As depicted in FIGS. 1 and 2, the multifunction peripheral 800 includes an image scanning device 820 that scans a document image, a multifunction peripheral main body 830 (main body of an image forming unit) that forms an image on a sheet, an operation panel 843 for operating the image scanning device 820 and the multifunction peripheral main body 830, and a calculation processing unit 841 that controls the image scanning device 820 and the multifunction peripheral main body 830 in accordance with an operation performed on the operation panel 843.

The image scanning device 820 can be used for image scanning on a stand-alone basis, or the multifunction peripheral main body 830 can be used for image forming on a stand-alone basis. Further, the image scanning device 820 and the multifunction peripheral main body 830 can be coordinated with each other to make a copy of an image. In addition, the multifunction peripheral 800 may include a memory device or a facsimile device, neither of which is shown. The memory device can store images scanned by the image scanning device 820 and images received by the facsimile device. The facsimile device can transmit images scanned by the image scanning device 820 or stored in the memory device and receive images from outside. Furthermore, the multifunction peripheral 800 may include an interface for connecting to a personal computer via a network. The personal computer connected to the multifunction peripheral 800 can use a function of the multifunction peripheral 800 to process the data that can be managed by the personal computer.

The image scanning device 820 includes an automatic document feeder 824 (single pass feeder or SPF) that automatically feeds a document and a scanner main body 822 that scans a document image. The image scanning device 820 includes, in addition to the components depicted in FIG. 2, components that are not depicted in FIG. 2 but depicted in FIG. 1. The scanner main body 822 also includes a platen 826 as depicted in FIG. 1.

The multifunction peripheral main body 830 includes a sheet feeder 10 that feeds a sheet, a manual sheet feeder 20 that enables manual sheet feeding, and an image forming unit 30 that forms an image on a sheet fed by the sheet feeder 10 or the manual sheet feeder 20.

The sheet feeder 10 includes a sheet housing unit 11 that houses sheets and a separating feeder 12 that separately feeds sheets housed in the sheet housing unit 11 one by one. The sheet housing unit 11 includes an inner plate 14 that pivots around a rotating shaft 13, and the inner plate 14 lifts a sheet by pivoting when the sheet is fed. The separating feeder 12 includes a pick-up roller 15 that feeds a sheet lifted by the inner plate 14 and a separating roller pair 16 that separates sheets that are fed by the pick-up roller 15 one by one.

The manual sheet feeder 20 includes a manual feed tray 21 that can contain sheets and a separating feeder 22 that separately feeds sheets in the manual feed tray 21 one by one. The manual feed tray 21 is pivotally supported by the multifunction peripheral main body 830 and is fixed at a predetermined angle to accommodate a sheet when the sheet is fed manually. The separating feeder 22 includes a pick-up roller 23 that feeds a sheet in the manual feed tray 21 and a separating roller 24 and a separating pad 25 that separate sheets that are fed by the pick-up roller 23 one by one.

The image forming unit 30 includes four process cartridges 31Y, 31M, 31C, and 31K that form yellow (Y), magenta (M), cyan (C), and black (K) images and photosensitive drums 740Y, 740M, 740C, and 740K described below. The image forming unit 30 also includes an exposure unit 32 by which surfaces of the photosensitive drums 740Y, 740M, 740C, and 740K are exposed to light, a transfer unit 33 that transfers toner images formed on the surfaces of the photosensitive drums 740Y, 740M, 740C, and 740K to a sheet, and a fixing unit 34 that fixes transferred toner images to the sheet. The alphabetical character (Y, M, C, or K) appended to each of the numerals represents the respective color (yellow, magenta, cyan, or black).

Each of the four process cartridges 31Y, 31M, 31C, and 31K is designed to be detachable from the multifunction peripheral main body 830 and replaceable. The four process cartridges 31Y, 31M, 31C, and 31K are designed to have similar construction except for a color used to form an image. Thus, only the construction of the process cartridge 31Y that forms an image of yellow (Y) will be described, and the process cartridges 31M, 31C, and 31K will not be repeatedly described.

The process cartridge 31Y includes the photosensitive drum 740Y as an image carrying member, a charging unit 741Y that electrically charges the photosensitive drum 740Y, a developing unit 742Y that develops an electrostatic latent image formed on the photosensitive drum 740Y, and a drum cleaner that removes toner remaining on the surface of the photosensitive drum 740Y. The developing unit 742Y includes a developing unit main body (not shown in detail) that develops the electrostatic latent image formed on the photosensitive drum 740Y and a toner cartridge (not shown in detail) that supplies toner to the developing unit main body. The toner cartridge is designed to be detachable from the developing unit main body and can be removed from the developing unit main body and replaced when the contained toner is exhausted.

The exposure unit 32 includes a light source (not shown in detail) that emits a laser beam, a plurality of mirrors (not shown in detail) that guide the laser beam to the photosensitive drums 740Y, 740M, 740C, and 740K, and other components. The transfer unit 33 includes an intermediate transfer belt 35 that carries toner images formed on the photosensitive drums 740Y, 740M, 740C, and 740K, primary transfer rollers 36Y, 36M, 36C, and 36K that perform primary transfer of the toner images formed on the photosensitive drums 740Y, 740M, 740C, and 740K to the intermediate transfer belt 35, a secondary transfer roller 37 that performs secondary transfer of a toner image transferred to the intermediate transfer belt 35 to a sheet, and a belt cleaner 38 that removes toner remaining on the intermediate transfer belt 35. The intermediate transfer belt 35 is wound around a drive roller 39a and an idle roller 39b and pressed against the photosensitive drums 740Y, 740M, 740C, and 740K by the primary transfer rollers 36Y, 36M, 36C, and 36K, respectively. The secondary transfer roller 37 nips (pinches) the intermediate transfer belt 35 with the drive roller 39a and transfers, at a nip portion N, the toner image carried by the intermediate transfer belt 35 to a sheet. The fixing unit 34 includes a heat roller 34a that heats a sheet and a pressure roller 34b that is pressed against the heat roller 34a.

The operation panel 843 includes a display unit 845 that displays predetermined information and an input unit 847 used by a user to input instructions to the image scanning device 820 and the multifunction peripheral main body 830. In the present embodiment, the operation panel 843 is disposed on the front side of the scanner main body 822. The front side and the back side of the scanner main body 822 refer to the front side and the back side, respectively, of the sheet of FIG. 1.

As depicted in FIG. 2, the calculation processing unit 841 includes a central processing unit (CPU) 841a that controls driving of the sheet feeder 10, the manual sheet feeder 20, the image forming unit 30, and the image scanning device 820 and a memory 841b that stores various programs to operate the CPU 841a and various pieces of information that are used by the CPU 841a. The calculation processing unit 841 forms an image on a sheet by coordinately controlling operation of the sheet feeder 10, the manual sheet feeder 20, the image forming unit 30, and the image scanning device 820 in accordance with an operation performed on the operation panel 843 by the user.

The calculation processing unit 841 may also control operation of the image scanning device 820.

Next, an image formation operation (image formation control performed by the calculation processing unit 841) performed by the multifunction peripheral 800 configured as described above will be described. In the present embodiment, as an example, a description will be given of an image forming operation in which the image forming unit 30 forms, on a sheet fed by the sheet feeder 10, an image of a document that is fed by the automatic document feeder 824 and scanned by the scanner main body 822.

When an image forming start signal is output in accordance with an input by a user to the input unit 847 of the operation panel 843, a document that has been placed on the automatic document feeder 824 by the user is automatically fed toward a document scanning position, and an image of the document is scanned at a document scanning position by the scanner main body 822.

Once the image of the document is scanned by the scanner main body 822, a plurality of laser beams are emitted onto the corresponding photosensitive drums 740Y, 740M, 740C, and 740K from the exposure unit 32 in accordance with image information of the scanned document. The photosensitive drums 740Y, 740M, 740C, and 740K have been charged in advance by the charging units 741Y, 741M, 741C, and 741K, respectively. Then each of the photosensitive drums 740Y, 740M, 740C, and 740K is irradiated with a corresponding laser beam, and an electrostatic latent image is formed on the photosensitive drum 740Y, 740M, 740C, or 740K. Then the electrostatic latent images formed on the photosensitive drums 740Y, 740M, 740C, and 740K are developed by the developing units 742Y, 742M, 742C, and 742K, respectively, and toner images of yellow (Y), magenta (M), cyan (C), and black (K) are formed on the photosensitive drums 740Y, 740M, 740C, and 740K. The toner images of respective colors formed on the photosensitive drums 740Y, 740M, 740C, and 740K are transferred to the intermediate transfer belt 35 by using the respective primary transfer rollers 36Y, 36M, 36C, and 36K to be superimposed on each other. A transferred and superimposed toner image (full-color toner image) is carried on the intermediate transfer belt 35 and conveyed to the nip portion N.

Simultaneously with the aforementioned image forming operation, sheets housed in the sheet housing unit 11 are separated one by one by the separating feeder 12 and conveyed to a sheet conveying path 26 by the pick-up roller 15. Then, an obliquely conveyed sheet is corrected at a registration roller pair 27 disposed upstream of the nip portion N in the sheet conveying direction, and the sheet is transferred to the nip portion N at a predetermined timing. The full-color toner image carried by the intermediate transfer belt 35 is transferred by the secondary transfer roller 37 to the sheet conveyed to the nip portion N.

The sheet to which the toner image has been transferred is heated and pressed in the fixing unit 34, and the toner image is melted and fixed, after which the sheet is discharged from the main body by a discharge roller pair 18 and contained in a discharge sheet containing unit 19.

When images are formed on both sides (a first side and a second side) of a sheet, before the sheet that has an image formed on the first side thereof is discharged from the main body, the sheet is conveyed to a duplex conveying path 17 by reverse rotation of the discharge roller pair 18 and then returned to the image forming unit 30 through the duplex conveying path 17. Then, an image is formed on the second side of the sheet in a manner similar to the first side, and the sheet is discharged from the main body. The sheet discharged from the main body is contained in the discharge sheet containing unit 19.

The aforementioned image scanning device can be realized by using hardware, software, or a combination of hardware and software. A method for image scanning performed by the aforementioned image scanning device can also be realized by using hardware, software, or a combination of hardware and software. Realization by software mentioned here indicates realization by using a computer that reads and executes a program.

The program can be stored on various kinds of non-transitory computer readable media and supplied to the computer. The various kinds of non-transitory computer readable media include tangible storage media of various types. Examples of the non-transitory computer readable media include a magnetic recording medium (for example, a flexible disk, a magnetic tape, or a hard-disk drive), a magneto-optical recording medium (for example, a magneto-optical disk), a compact-disk read-only memory (CD-ROM), a CD-R, a CD-R/W, a semiconductor memory (for example, a mask ROM, a programmable ROM (PROM), an erasable PROM (EPROM), a flash ROM, or a random access memory (RAM)). The program may be supplied to the computer using transitory computer readable media of various types. Examples of the transitory computer readable media include electric signals, optical signals, and electromagnetic waves. The transitory computer readable medium can supply the program via a wired transmission path, such as via electric wires or optical fibers, or via a wireless transmission path.

The embodiments of the present disclosure can be used for a multiple cropping function.

The present disclosure contains subject matter related to that disclosed in Japanese Priority Patent Application JP 2016-240390 filed in the Japan Patent Office on Dec. 12, 2016, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image scanning device comprising:
   a document image data generator that captures a plurality of pieces of document image data, each of which corresponds to one of a plurality of documents placed on a platen, and acquires positions of the plurality of pieces of document image data;
   an order detector that detects positions and an order in which a plurality of document candidates have been placed on the platen; and
   a placement order acquirer that acquires an order in which the plurality of documents, each of which corresponds to one of the plurality of pieces of document image data, have been placed on the platen in accordance with at least the positions of the plurality of pieces of document image data, each of which corresponds to one of the plurality of documents placed on the platen; wherein the order detector is configured or programmed to include:
an image generator that acquires moving images by capturing images of the platen; and
a determiner that determines an order in which the plurality of document candidates have been placed in accordance with the moving images acquired by the image generator.

2. The image scanning device according to claim 1, wherein the order detector detects the plurality of document candidates placed on the platen and the order in which the plurality of document candidates have been placed on the platen in response to placement of a new document candidate on the platen and removal of a document candidate present on the platen from the platen.

3. The image scanning device according to claim 1, wherein the placement order acquirer compares the positions of the plurality of document candidates detected by the order detector and the positions of the plurality of pieces of document image data acquired by the document image data generator, updates the order detected by the order detector by removing a document candidate with a position that corresponds to none of the positions of the plurality of pieces of document image data, and acquires an order in which the plurality of documents have been placed on the platen in accordance with a correspondence between the positions and the order of the plurality of document candidates after the updating and a correspondence between the position of each of the document candidates that has a corresponding piece of the document image data and the position of the corresponding piece of the document image data.

4. The image scanning device according to claim 1, wherein the determiner detects a plurality of individual document candidates in accordance with the moving images acquired by the image generator, and determines an order in which the plurality of document candidates have been placed in accordance with an order in which the plurality of individual document candidates have been detected.

5. An image forming apparatus comprising:
the image scanning device according to claim 1.

6. An image scanning method comprising:
capturing a plurality of pieces of document image data, each of which corresponds to one of a plurality of documents placed on a platen, and acquiring positions of the plurality of pieces of document image data;
detecting an order that detects positions and an order in which a plurality of document candidates have been placed on the platen; and
acquiring an order in which the plurality of documents, each of which corresponds to one of the plurality of pieces of document image data, have been placed on the platen in accordance with at least the positions of the plurality of pieces of document image data, each of which corresponds to one of the plurality of documents placed on the platen; wherein
the detecting an order is performed based on acquiring moving images by capturing images of the platen and determining an order in which the plurality of document candidates have been placed in accordance with the moving images acquired.

7. A non-transitory computer-readable medium storing an image scanning program causing a computer to function as the image scanning device according to claim 1.

* * * * *